United States Patent [19]
Rialan et al.

[11] Patent Number: 5,550,787
[45] Date of Patent: Aug. 27, 1996

[54] SEISMIC ACQUISITION SYSTEM WITH DECENTRALIZED PROCESSING MEANS

[76] Inventors: Joseph Rialan, 15, rue Bigôts, 92190 Meudon; Christian Grouffal, 14, allée Louis David, 92500 Rueil-Malmaison, both of France

[21] Appl. No.: 190,198

[22] PCT Filed: Jun. 11, 1993

[86] PCT No.: PCT/FR93/00562

§ 371 Date: Feb. 8, 1994

§ 102(e) Date: Feb. 8, 1994

[87] PCT Pub. No.: WO93/25919

PCT Pub. Date: Dec. 23, 1993

[30] Foreign Application Priority Data

Jun. 11, 1992 [FR] France .................................. 92 07243

[51] Int. Cl.⁶ .............................. G01V 1/28; G08C 17/00
[52] U.S. Cl. ................. 367/77; 340/870.15; 340/870.28; 367/21
[58] Field of Search ................................ 367/76, 77, 21; 340/870.11, 870.15, 870.28

[56] References Cited

U.S. PATENT DOCUMENTS

| | | | |
|---|---|---|---|
| 4,298,969 | 11/1981 | Rickenbacker | 367/76 |
| 4,345,334 | 8/1982 | Nordahl | 340/870.28 |
| 4,509,150 | 4/1985 | Davis | 367/76 |
| 4,594,692 | 6/1986 | Read et al. | 367/77 |
| 4,639,901 | 1/1987 | Warmack et al. | 367/77 |
| 4,725,992 | 2/1988 | McNatt et al. | 367/77 |
| 4,885,724 | 12/1989 | Read et al. | 367/77 |
| 4,897,821 | 1/1990 | Thierry et al. | 367/76 |
| 4,905,205 | 2/1990 | Rialah | 367/77 |
| 5,206,835 | 4/1993 | Beauducel | 367/77 |
| 5,276,655 | 1/1994 | Rialan et al. | 367/77 |

FOREIGN PATENT DOCUMENTS

| | | | |
|---|---|---|---|
| 275781 | 7/1988 | European Pat. Off. | 367/77 |
| 9212442 | 7/1992 | WIPO | 367/77 |

*Primary Examiner*—Michael J. Carone
*Assistant Examiner*—Theresa M. Wesson
*Attorney, Agent, or Firm*—Antonelli, Terry, Stout & Kraus

[57] ABSTRACT

The system includes a plurality of acquisition devices ($A_i$) for collecting signals received by receivers (Rk) and a central control, recording and processing station. This station manages the performance of the devices ($A_i$), of successive signal acquisition cycles and thereafter the centralization thereof. In order to relieve the central station of part of the tasks thereof in case of a high volume of data to be collected and processed, acquisition devices are used which have management processors (2, $M_1$, $M_2$) and with complementary computing processors (7, $M_3$) programmed for carrying out processings of the data before the transmission thereof. Various combinations of seismic signals, data compression, and quality controls are performed in real time during the phase of setting of the seismic equipment (seismic receivers and acquisition device electronics (CA1 to CAn) in the devices $A_i$ in the field), etc, immediately accessible to operators in the field.

20 Claims, 5 Drawing Sheets

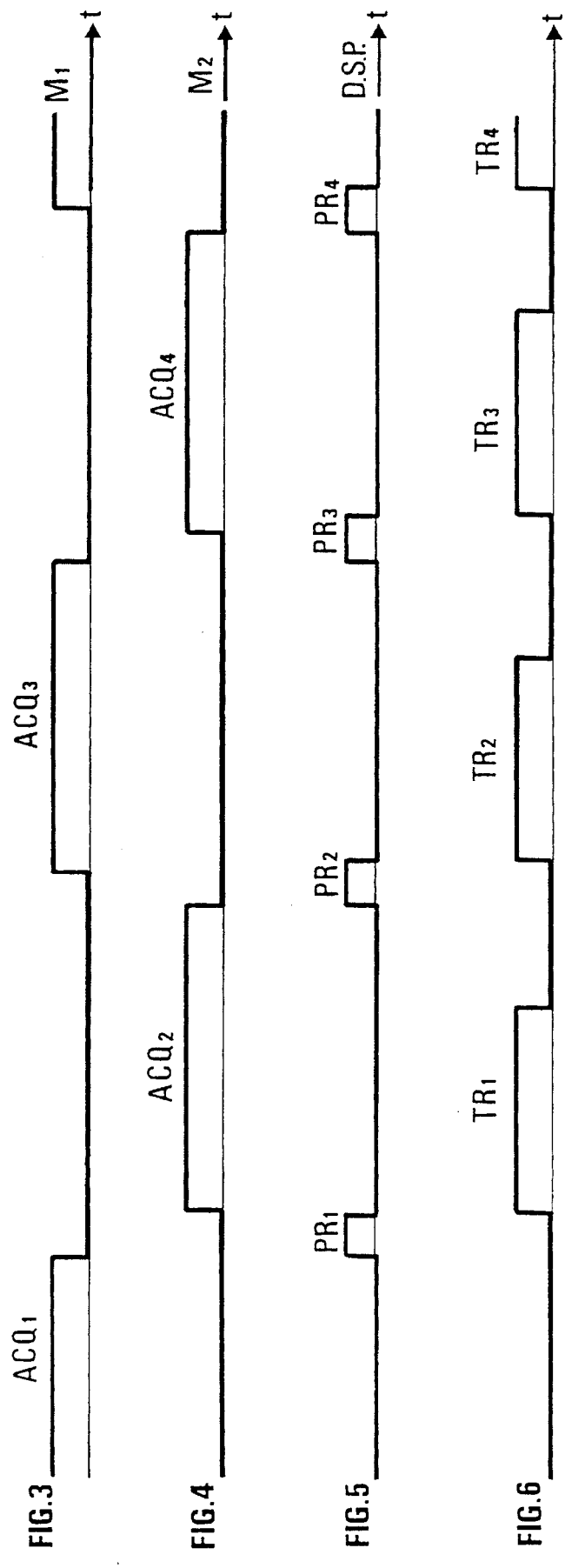

SEISMIC ACQUISITION SYSTEM WITH DECENTRALIZED PROCESSING MEANS

BACKGROUND OF THE INVENTION

1. Field of the Invention

The invention relates to a seismic acquisition system provided with decentralized processing. More particularly, the invention relates to a data acquisition system including at least one acquisition unit suited for carrying out various processings of data acquired locally and for reducing to a large extent the volume of data transferred between the units and a central control and recording station or a portable control box.

Such a system may for example be used in the field of seismic prospecting where a large number of seismic receivers (each made up of one or several elementary pickups combined to form a "string" and delivering a signal called a "trace") has to be set in a zone to be explored, these receivers being placed in contact with a subsurface formation, and for achieving emission-reception cycles with the transmission in the ground of seismic signals through the controlled triggering of a seismic source causing the reception of the signals reflected by the subsoil discontinuities and the acquisition of the signals. Such an acquisition is achieved for example by means of a plurality of acquisition boxes distributed in the field, each digitizing and storing the signals received in reference to one or several pickups and, by an order from a central station, transmitting them sequentially thereto by cable or by radio.

2. Description of the Prior Art

Various acquisition systems are described for example in French Patents 2,511,722, 2,538,561, 2,599,533, 2,627,652 or in the French patent application EN.90/16,443 corresponding respectively to U.S. Pat. Nos. 4,583,206, 4,979,152, 4,815,044, 4,908,655, 5,276,655 filed by the applicant.

The current trend consists in using increasingly complex acquisition systems with a great number of receivers sometimes distributed over great distances and of acquisition boxes. The volume of data acquired is often very high. The number of seismic traces to be centralized may exceed 1000 in many cases. Transferring them to the central station, preferably at the end of each period of reception of the seismic signals, is a complicated task. The central station must be powerful enough to manage in real time the centralization thereof on the one hand and, on the other hand, to perform in real time a certain number of preprocessings: trace correlation, combination of traces coming from multiples pickups such as triaxial geophones, etc.

Transmission of a great quantity of data is another cause of difficulties. If radio links are used for this centralization, as it is often the case in practice, the restrictions which are often imposed by local regulations concerning the use and the availability of transmission frequencies have to be taken into account. The alternative consisting in transmitting the data to be centralized by means of transmission lines also involves drawbacks as the cables capable of transmitting high rates are complex and costly. It is therefore important to reduce as much as possible the volume of data to be transmitted in order to facilitate its transmission as well as its processing after the transmission thereof.

Before the acquisition operations which will be performed with the system of receivers and of acquisition boxes start or, if need be, during these operations, it is also usual to test the operation of each receiver and/or of each associated acquisition box to determine if operation thereof is trouble free.

The pickups (geophones, hydrophones) are considered to be the most vulnerable parts of seismic acquisition chains. It is necessary to check whether the static and dynamic electromechanical parameters required for to each receiver (such as electric resistance, sensitivity, natural resonance frequency or damping factor) are in accordance with the specifications and whether the pickups constituting the receivers are properly coupled to the ground, knowing that an incorrect positioning leads to a significant change in the damping factor and in the sensitivity thereof.

It is well-known to test pickups such as moving-coil geophones by applying thereto a current step and by recording their response curve to this current step. Such a testing method, described for example in the assignee's French Patent 2,613,496 corresponding to U.S. Pat. No. 4,862,425 is used to check the operation of geophones located in well sondes to determine if they are trouble free. Switch devices are placed between each geophone to be tested and the input of an electronic acquisition chain for amplifying, digitizing and storing the signals delivered by the pickup. Application of calibrated current steps, then connection of the excited pickup to the associated acquisition chain and remote transmission in a coded form allow data relating to the pickup itself and to the associated acquisition and transmission chain to be obtained.

The testing of pickups is based on the analysis of their response curve at a given electric current step. This curve generally includes as illustrated in (FIG. 7) a first amplitude peak $U_M$ of "width" T, and a second amplitude peak $U_m$. It is known how to calculate approximately the damping factor by combining these three characteristics.

This method is not very accurate since the few measurements which are combined depend much on the acoustic and electronic noise, and it is ineffective if, because of too fast a damping, the response curve does not have a second peak.

SUMMARY OF THE INVENTION

The seismic acquisition system according to the invention has decentralized processing capacities allowing substantial reduction of the volume of the data transferred between at least one acquisition device for collecting the data received by an array of seismic receivers coupled to a zone to be explored and at least one control unit (a central control and recording station for example, or a mobile control box which may be taken to the field by an operator), with the help of linking device, each acquisition device including at least one acquisition chain for digitizing the signals received by at least one receivers coupled to the zone, and a control set for controlling the acquisition and the storage of signals.

The system according to the invention includes a management device and processing device controlled by the management device, for performing processings on signals coming from the receivers before they are transferred to the control unit, the processing device including a processor programmed for performing processings of the acquired seismic signals and for carrying out qualification tests on each seismic receiver and each acquisition chain.

The processor works for example according to two different methods of operation, one being an active mode for carrying out the data processings and the other being a standby mode corresponding to a more limited electric consumption.

The system includes for example means for compressing digitized signals to be transmitted or means for determining without delay the electric and electro-mechanical characteristics of each seismic receiver through the determination of an electric circuit modeling of the receiver, or means for combining seismic signals received at different times by at least one of the receivers.

The control unit is for example a central station for controlling and recording seismic signals or a control box which may be connected to each acquisition device through a short link (infrared-ray link for example) and enabling an operator to order the immediate performance of qualification tests, so as to check if the right positioning of each receiver exists and the operation of each acquisition chain.

Preferably, each acquisition device includes a self-contained power supply and two storage units for the alternate storage of data received during successive seismic emission-reception cycles, and a transmission device for transmitting at least part of the data contained in the first of the two storage units during the acquisition and the storage of data in the second storage unit.

According to an embodiment of the invention each acquisition device includes a erasable permanent memory for instructions received from the control unit (central station or mobile control box) via the linking device.

According to another embodiment of the invention, each acquisition device includes a first and a second switching module associated with each receiver for connecting the latter and a reference resistance successively to the input of a signal acquisition chain, a third and a fourth switching module connected to a power supply for voltage or current pulses to the receiver and to the associated reference resistance, and at least one local oscillator for applying signals of a determined frequency at the input of the acquisition chain.

The invention further relates to a seismic acquisition method for reducing substantially a volume of a data collected by at least one acquisition device in response to signals received by an array of seismic receivers coupled with a zone to be explored and transferred to at least one control unit, comprising achieving, within each acquisition device, qualification tests for each receiver to determine the electric and electro-mechanical features of the receiver, through the application of calibrated signals to each receiver and the recording of the response curve of the pickup in response to the signal applied thereto.

The method comprises:

modelling the seismic receivers in the form of an equivalent electrical circuit, determining the response curve of the modeled receiver and its deviations from the response curve resulting from the model; and optimizing the receiver model by reducing the deviations, according to an iterative operating sequence including a modification of the electric modeling circuit, determining the corresponding response curve and comparing with the real response curve, so as to determine the best electric circuit modeling at of the receiver and to deduce precisely the electromechanical characteristics thereof.

With the structure defined above, the system according to the invention allows the volume of data transferred to the central station to be considerably with part of the processing achieved after centralization being partly performed in each acquisition device. The data rate to be transmitted becomes substantially lower and the links between the central station and the acquisition devices in the field (radio channels or transmission lines) are more easily available and/or less costly. The decentralization of some operations in acquisition devices having a self-contained power supply is facilitated if a processor which works only intermittently, without computation loss, is selected.

The complex processing capacities of the acquisition boxes and the possibility of communicating therewith through a local link also allow an operator to check instantaneously, by means of tests, the proper positioning of the receivers in the field and the trouble-free operation of the acquisition chains.

BRIEF DESCRIPTION OF THE DRAWINGS

Other features and advantages of the device according to the invention will be clear from reading the description hereafter of an embodiment given by way of non limitative examples, with reference to the accompanying drawings in which:

FIGS. 3 to 6 show, in the form of chronograms, the distribution in time of the various functions performed by the acquisition devices;

DESCRIPTION OF THE PREFERRED EMBODIMENTS

A seismic exploration device generally includes a source S of seismic waves and a reception and acquisition system often containing a great number of receivers $R_1, R_2 \ldots R_n$ distributed along a seismic profile to be explored, acquisition devices installed in boxes $B_1, B_2 \ldots B_n$ distributed in the field and a central control and recording station 1 located in a vehicle, for controlling the centralization in station 1 of the signals received by receivers $R_1$ to $R_n$. Each receiver R generally includes several elementary pickups $C_1, C_2 \ldots C_p$ inter-connected electrically and producing each a "seismic trace".

Acquisition boxes B such as those described in the above-cited French patent 2,511,772, which communicate with the central station either through radio waves or through transmission lines, are for example used. With this type of boxes, connection of a cable to a box results in an automatic deactivation of the emission and reception radio included in the box and the central station is designed switching automatically to the appropriate communication channel so as to communicate with any box, whatever the mode of connection thereof.

A first group $G_1$ of boxes $B_1$ to $B_j$ communicating through radio waves with the central station 1 and a second group $G_2$ of boxes $B_1$ to $B_n$ which, because of difficult radio links in the working area, have to be linked to the central station through a common transmission cable TC, are for example arranged in the field.

Figure 1:
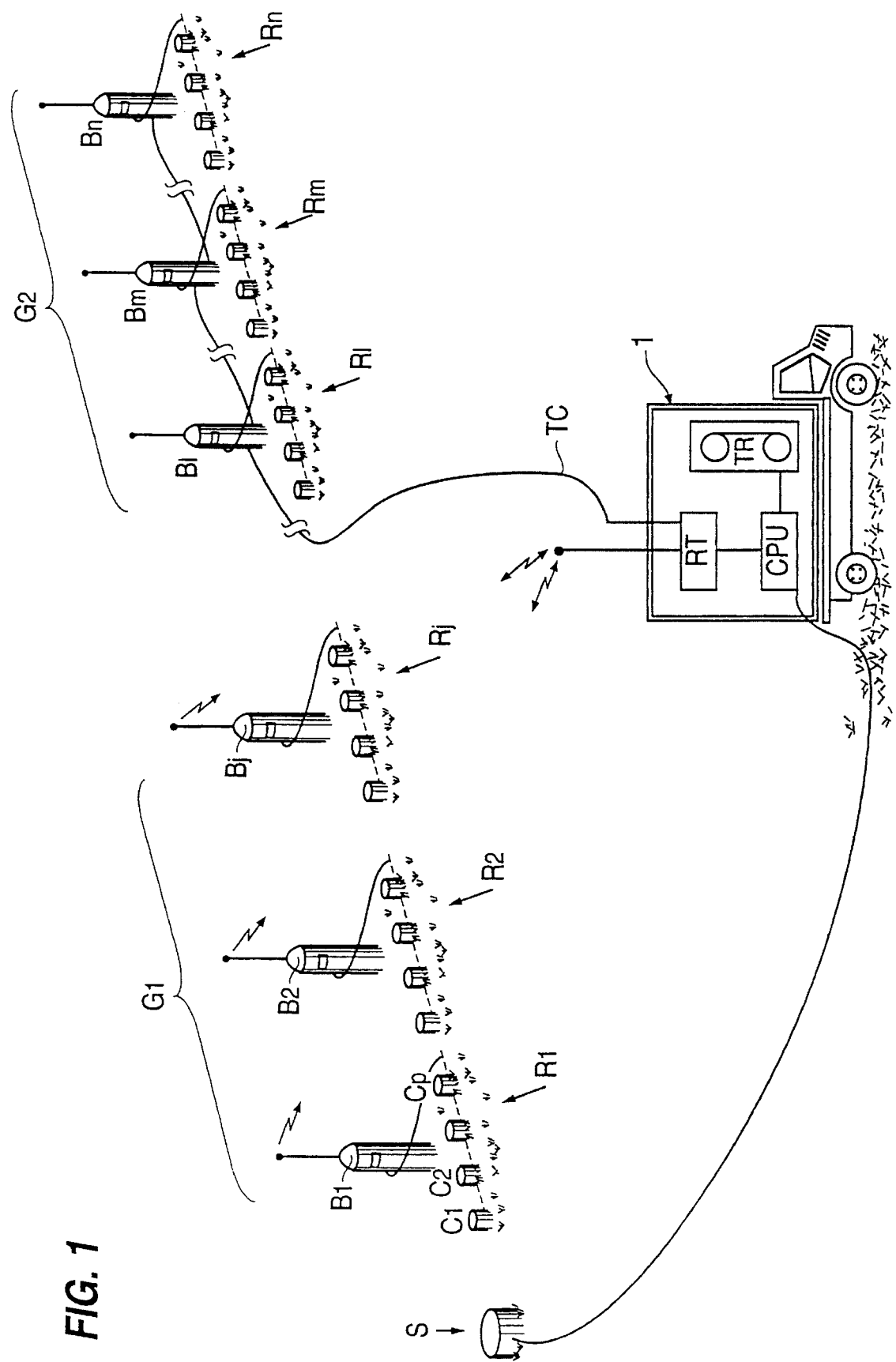
FIG. 1 diagrammatically shows a seismic acquisition device in an exploration zone.
Figure 2:
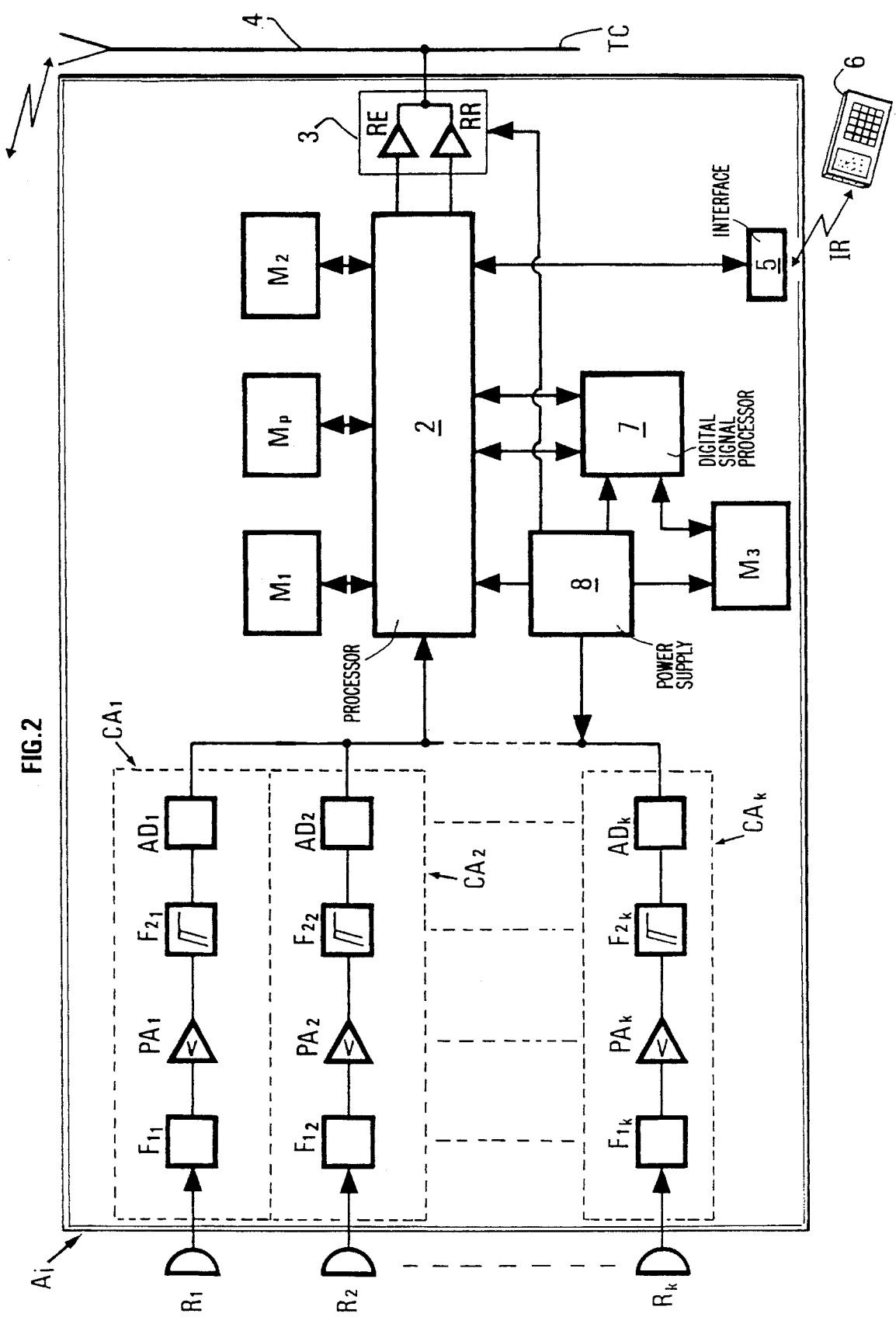
FIG. 2 is a block diagram of an acquisition device.
Figure 7:
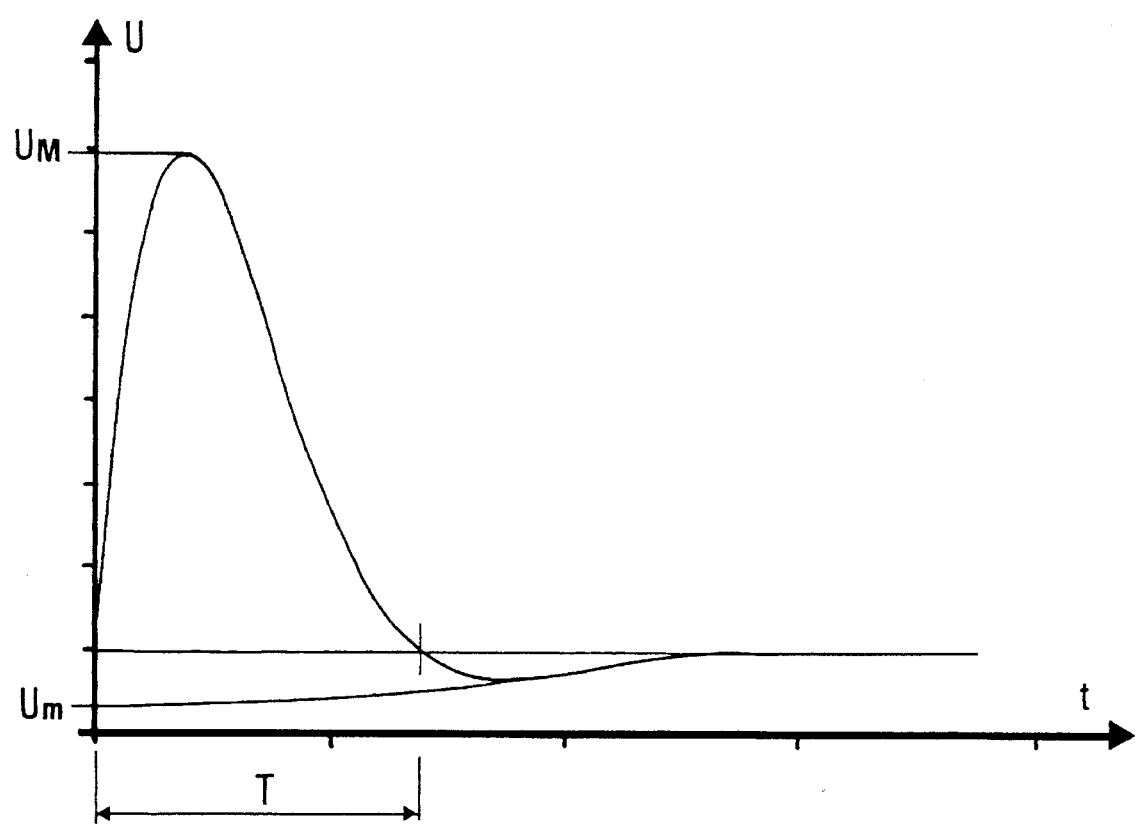
FIG. 7 diagrammatically shows a conventional curve of the response of a geophone to a received pulse signal.

The acquisition device A in each acquisition box $B_1$ to $B_n$ collects the signals received by a single receiver R as shown in FIG. 1 or more generally by k different receivers as shown in FIG. 2. The purpose of each acquisition device $A_i$ is to digitize the signals of the associated receivers and to store them. The central station includes a control unit CPU, a mixed communication set RT such as that described in the above cited French Patent 2,511,772, allowing the control unit to communicate with the various boxes $B_1$ to $B_n$, as the case may be, by radio or transmission cable TC. The central station controls the successive triggerings of the source S, the acquisition, by the various devices, of the signals reflected by the subsoil discontinuities and received by receivers $R_1$ to $R_n$, and controls thereafter the centralization of the stored data. By order of central station 1, each acquisition device in boxes $B_1$ to $B_n$ transfers thereto the data stored by the device through the appropriate communication channel. The acquisition system described in the above-cited patents may be advantageously used therefore, with the modifications peculiar to the invention which will be described hereafter.

Each acquisition device $A_i$ as illustrated in FIG. 2 collects for example k signals picked up by a certain number k of seismic receivers $R_1, R_2, R_k$. To that effect, it includes for example k acquisition chains $CA_1$ to $CA_k$ receiving respectively the k signals and each containing a low-pass filter $F1_1$, $F1_2 \ldots F1_k$ of the VHF type, a preamplifier $PA_1, PA_2 \ldots PA_k$, a high-pass filter $F2_1, F2_2 \ldots F2_k$ and an analog-to-digital converter $AD_1, AD_2 \ldots AD_k$ for converting the amplified and filtered analog signals into digital words. All the chains are connected to a management microprocessor 2 processing the 16-bit to 32-bit digital words for example, programmed for managing acquisition and transfers with the central station 1. Two memory blocks $M_1, M_2$ and a memory $M_p$ for the programs are associated with microprocessor 2. Processor 2 is connected to an emission-reception unit 3 by radio or by wire line for the channel used for communication with the central station 1. If it is a radio channel, unit 3 includes a radio transmitter RE and a radio receiver RR which communicates with an antenna 4. An interface unit 5 described in the above cited patent French Patent 2,608,780 cited above, also allows communication through infrared rays with an initialization box 6 by means of which an operator may communicate to management processor 2 addressing instructions and instructions for the selection of working parameters of the acquisition chains, as well as identification numbers allocated to the acquisition device in view of its position along the seismic profile to be studied.

The system according to the invention includes in each acquisition device $A_i$ preferably a processor 7 specialized for certain computations. It may be for example a 32-bit floating-decimal processor of the digital signal processor 96002 type notably manufactured by Motorola, which is associated with a DMA type device for accelerating data block transfers between the two processors 2 and 7. A working memory $M_3$ is added to processor 7. Each acquisition device also includes a self-contained power supply 8.

The rules for processor 2 are as follows: Its functions are to decode the orders transmitted by central station 1 and to control:

the acquisition of the signals of receivers $R_1$ to $R_k$ by the various acquisition chains, transmissions in connection with unit 3, memories $M_1$ and $M_2$ for the temporary storage of data, inputs-outputs, interruptions between programs, and exchanges with DSP computing processor 7, etc.

A computing processor 7 of this type is advantageous in that it has two different conditions, an activity condition and a standby condition characterized by an extremely low and nearly zero power consumption. When processor 7 has completed the processings controlled by processor 2 and when it is reset into the standby condition thereby, it automatically saves the computations context, which avoids any reinitialization and therefore wasting of time at each reactivation.

Owing to its specific structure, DSP processor 7 is particularly suited for performing high-speed operations such as format conversions, multiplications of complex numbers, FFT type Fourier transforms, correlations between the received signals and the emitted signals, digital filterings, successive shooting stackings with cancellation of disturbance noises of non seismic nature, combinations of the signals delivered by multiaxial seismic receivers such as triaxial geophones for example, etc. Processor 7 may also implement data compression algorithms so as to reduce the volume of data to be transmitted and thereby to reduce either the transmission time or the required radio bandwidth, etc.

Preprocessings achieved locally before transmission contribute to reducing substantially the number of tasks assigned to the central station 1 and therefore the installed computing capacity, which becomes considerable when the amount of seismic traces to be acquired in real time amounts to several hundred or even exceeds a thousand traces.

This lay-out including two processors 2 and 7 allows many operations to be performed in real time prior to the transmission of data to the central station 1, without affecting the normal course of the management operations achieved by management processor 2. The alternate use of two memory blocks $M_1$, $M_2$ allows for example the transmission of data collected during an emission-reception cycle and preprocessed during the collection of the seismic signals of the next cycle to be achieved. The chronograms $ACQ_1$, $ACQ_2 \ldots ACQ_4$ in FIG. 3 show for example four periods of reception and acquisition of successive seismic data distributed in the two memory blocks $M_1$ and $M_2$, $PR_1$, $PR_2$ . . . , being time intervals for the preprocessing of the data following immediately each of the acquisition intervals and $TR_1, TR_2 \ldots$ are the intervals for the transmission of the data acquired respectively during periods $ACQ_1, ACQ_2$, etc, and preprocessed by DSP processor 7 during the computing periods $PR_1, PR_2$, etc.

DSP type computing processors are very fast and their activity time at each acquisition cycle is relatively short. Their electric power consumption remains therefore very low on average, which makes them compatible with the use in acquisition boxes provided with a self-contained power supply.

A memory Mp of the erasable "flash" permanent memory type may be advantageously used so as to provide remote control, from the central station or from control box 6, a change in certain instruction sets, which allows certain functionalities of the acquisition devices to be changed and notably the performance of preprocessings by computing processor 7 to be controlled.

The remote loading of specific programs may notably allow each acquisition device to achieve preliminary tests on the pickups and the electronic acquisition chains.

Qualification test operations on the field equipment (receivers and/or acquisition devices) are for example carried out as described hereunder.

Figure 8A:
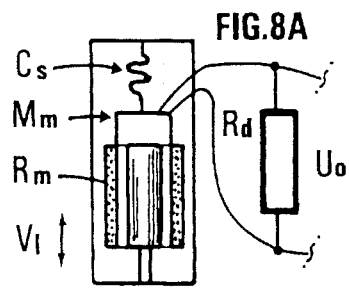
FIG. 8A and 8B diagrammatically show a geophone and an electric circuit modeling the working thereof.

It is well-known to electromechanical transducer specialists the response of a pickup such as a geophone for example may be modeled when it is subjected to a seismic signal by determining by analogy the characteristics of an electric circuit consisting of an appropriate combination of passive elements : resistors, capacitors, self-induction, etc, which has an identical response curve. The geophone generally includes (as illustrated in FIG. 8A) a moving coil of mass Mm supported by springs of an elastic coefficient or compliance Cs in the gap of a magnet integral with a box coupled to the ground. Its damping factor is Rm. It is loaded by an outer electric resistance Rd.

Figure 8B:
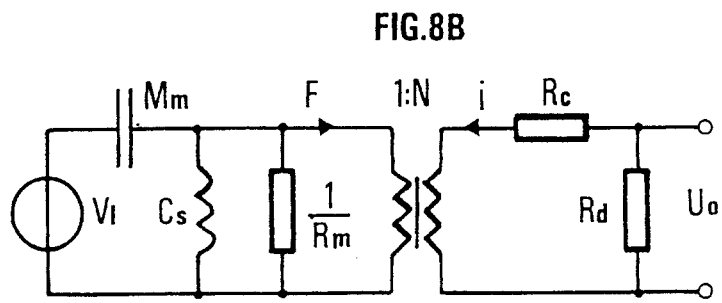

By analogy, an electric voltage $V_1$ is connected with the relative velocity $U_2$ of the moving coil with respect to the ground, and an electric current $I_i$ is connected with the applied force F. The equivalent electric circuit (FIG. 8B) includes a primary circuit coupled through a transformer of ratio 1:N to a secondary circuit. The moving mass Mm is expressed by a capacitance and the compliance Cs of the spring is expressed by a self-induction. The damping factor D is determined both by the inner mechanical damping 1/Rm and by the load resistance Rd. The sensitivity of the geophone is expressed by the ratio 1:N of the transformer which changes the velocity of the coil into an electric voltage Rc is the electric resistance of the geophone.

The circuit modeling the geophone is governed by a linear differential equation of the second degree which is solved by an iterative resolution method known in the art, which is described for example by Steiglitz et al in IEEE Trans. Automat. Contr., Vol.10, pp.461–464.

After selecting initial values for the equivalent electric components, the corresponding response curve is determined, analyzed and, according to the deviations observed with respect to the real response curve produced by the geophone, the initial values selected for equivalent circuit elements are increased by increments and the modified response curve is calculated. Through successive iterations, the values of the elements of the equivalent circuit are made to converge until the differences between the response curves are substantially cancelled. The real electromechanical characteristics of each receiver are deduced therefrom.

The implementation of this iterative process implies complex calculations known to signal processing specialists, such as matrix algebra, digital filtering, transcendental function calculations, etc. The use of a specialized processor such as processor 7, which can perform these complex calculations nearly instantaneously, allows tests to be carried out in the field during the preliminary stage of setting of the seismic equipment, which would otherwise be impossible as described further in the description.

Figure 9:
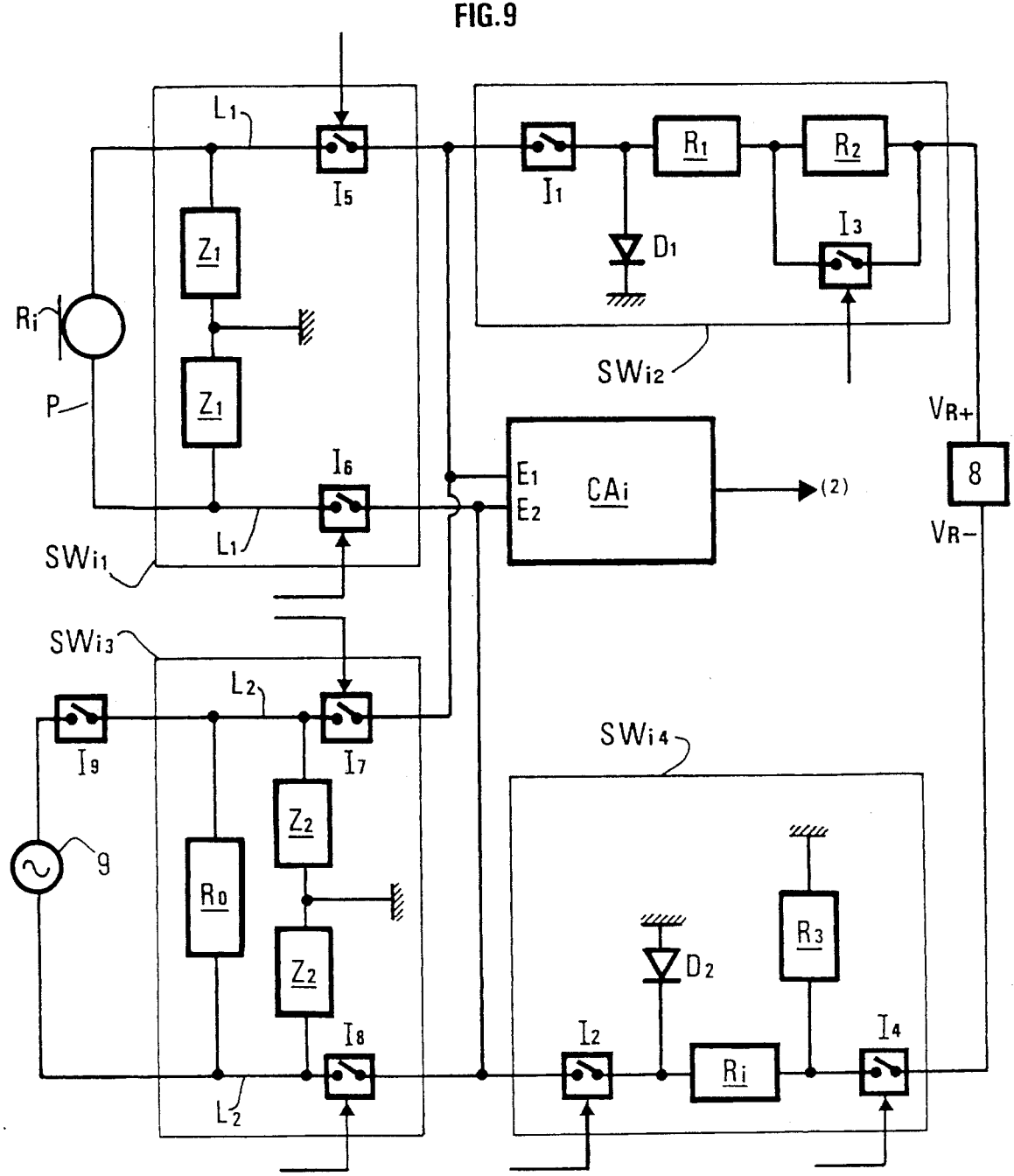
FIG. 9 shows an embodiment of a testing set associated with each seismic receiver and allowing the analysis of its operation and of the associated acquisition chain to be obtained.

In order to measure the characteristics of each receiver $R_i$, each one of the two associated conducting wires L1 as illustrated in FIG. 9 is connected with the inputs E1, E2 of the associated acquisition chain $CA_i$, by means of a first switching unit $SW_{i1}$ including two electronic switches $I_5$, $I_6$ and two high impedances Z1 loading it symmetrically with respect to the ground.

The electric supply unit 8 produces two symmetric reference voltages VR+ and VR−. The first one is applied to a second switching unit $SW_{i2}$ including a resistance R2 which may be by-passed by a switch $I_3$, in series with a second resistance R1 and a diode D1. The voltage at the terminals thereof is applied at the input E1 of the acquisition chain $CA_i$ by means of a switch $I_1$.

Furthermore, an oscillator 9 is connected to a third switching unit SW3 including a calibrated load resistance $R\phi_o$ of relatively low value and two high impedances Z2 loading it symmetrically with respect to the ground. The two conductors $L_2$ associated with oscillator 9 are connected respectively to the inputs E1 and E2 of chain $CA_i$ by means of two switches $I_7$ and $I_8$. The supply voltage VR—produced by supply unit 8 is applied, via a switch $I_4$, to a resistance R3, and to a diode D2 in series with a resistance $R_i$. The voltage at the terminals of diode D2 is applied at the input E2 of chain $CA_i$ by means of a switch $I_2$.

In case several receivers $R_i$ are associated with a single acquisition device, the local oscillator 9 is connected to switching unit $SW_{i3}$ by means of a switch $I_9$ so as to connect it selectively for certain types of tests, as described hereafter.

Once the reception system is installed in the field, test sequences are started in order to determine the real characteristics of each associated seismic receiver : electric resistance, sensitivity, natural frequency, damping factor, loss of current towards the ground, etc, taking into account the effective coupling conditions of each pickup with the formations.

Control may be transmitted from the central station to each acquisition device which provides an account of the results of the tests in return.

Control may also be transmitted by an operator in the field, who communicates orders directly by means of the infrared transmission box 6. This procedure is advantageous because it allows positioning control. Under the control of management processor 2, the specialized processor 7 calculates instantaneously the characteristics of the receiver and, through the same infrared transmission device, it communicates the results to the operator who reads them immediately on the screen of his box 6. If the results obtained deviate too much from the expected values, the operator may correct anomalies : defective electric connections, and positioning in the ground and/or coupling.

Processor 2, to which are relayed computations performed by specialized processor 7, may control successively several test sequences.

Figure 10:
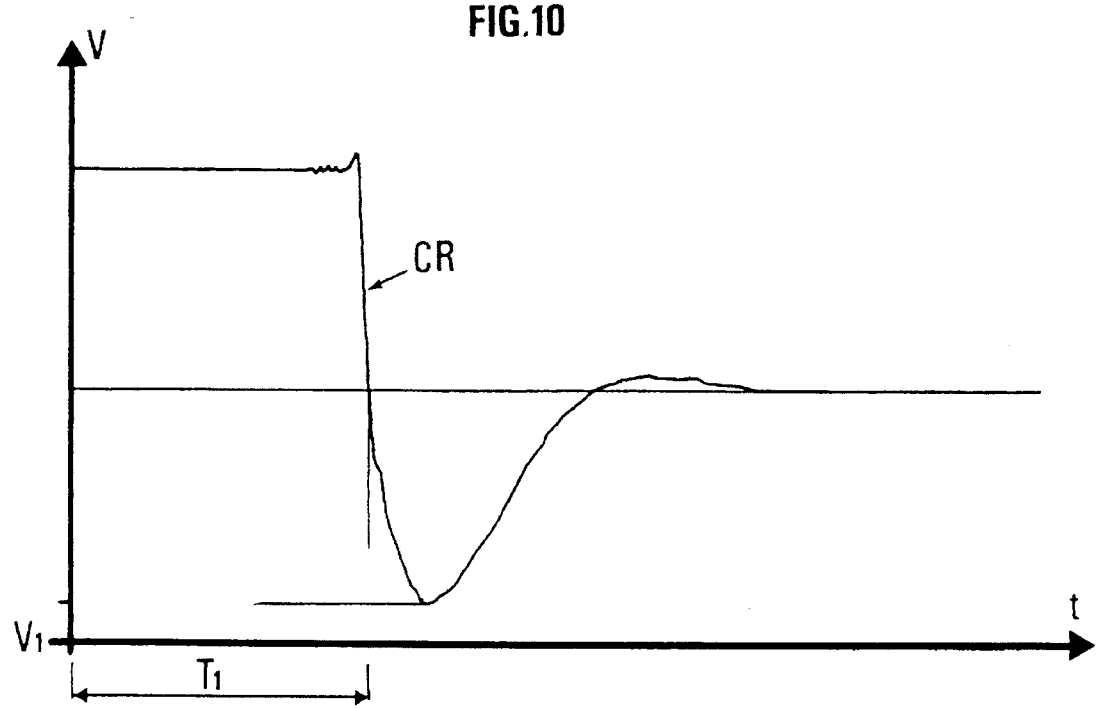
FIG. 10 shows an example of a response curve of a geophone acquired during testing operations achieved locally by an associated acquisition device.

A first sequence consists in measuring the characteristics of each receiver $R_i$.

a) To that effect, the local oscillator 9 is disconnected and switches $I_7$ and $I_8$ are on. The processor 2 controls the closing of switches $I_3$, $I_4$, $I_5$ and $I_6$, and the closing of switches $I_1$ and $I_2$ during a time "window" T1 so as to apply a voltage step to receiver $R_i$. After the interval T1, when $I_1$ and $I_2$ are open again, processor 2 controls the acquisition of the response CR illustrated in FIG. 10 of the receiver through acquisition chain $CA_1$ and notably of the amplitude $V_1$.

b) The same operation is carried out thereafter by disconnecting receiver $R_i$ (opening of $I_5$ and $I_6$) and by connecting instead the calibrated load resistance $R\phi$ of oscillator 9 so as to measure the amplitude $V_2$ of the voltage step applied.

At the end of stages a) and b), after amplitudes $V_1$ and $V_2$ have been measured, the specialized processor 7 determines the static resistance of receiver $R_i$ by means of the relation:

$$R_s = k \frac{(2V_R - V_2)}{V_2} \cdot \frac{V_1}{(2V_R - V_1)}$$

where k is a proportionality factor.

c) By applying the above-mentioned iterative method, performed by processor 7, the characteristics of the electric circuit modeling the behaviour of each receiver $R_i$ are determined according to an iterative process defined above and the real electromechanical and electric characteristics thereof, such as its natural frequency, its damping factor and its sensitivity, are deduced therefrom.

Processors 2 and 7 are also programmed for carrying out other tests on each receiver.

The above-mentioned stage a) may for example be started again with the application to receiver $R_i$ of a current impulse of a duration T2 shorter than T1 and the acquisition of its response by the associated acquisition chain $CA_i$. In this case, the acquisition device may check whether the responses of the various receivers associated with their respective acquisition chains are in phase and whether they have substantially identical forms. A calculation called a fast Fourier transform allows notably the effective cut-off frequency of filters F1, F2 (FIG. 2) of each chain and the attenuation slopes thereof to be determined. In the opposite case, each acquisition device is in a position to provide a message of any abnormalities which will be transmitted either to the central station or to an operator in the vicinity.

Leakage currents between each receiver and the ground may also be measured. To that effect, after the closing of switches $I_1$ and $I_2$ and the opening of switches $I_3$, $I_4$, $I_6$ and $I_8$ have been controlled, switch $I_5$ is closed and switch $I_7$ is opened. By way of comparison, the same leakage current in the reference resistance $R\phi$ is measured thereafter simply by inverting the states of switches $I_5$ and $I_7$ mentioned above, the first one being open and the second being closed.

By connecting the local oscillator 9 in parallel on the resistance $R\phi$ while closing switches $I_7$, $I_8$, $I_9$ and opening switches $I_5$ and $I_6$, processors 2 and 7 may trigger the acquisition of the signal it delivers, determine whether the response from acquisition chain $CA_i$ is correct for various frequencies and measure the distortion. In case several receivers are connected to a single acquisition device and local oscillator 9 is connected to the unit SW3 of one of them, it is also possible to measure the crosstalk between the channels by closing the switches $I_5$, $I_6$ associated with one of the other receivers.

The measured or calculated characteristics are stored in memories $M_1$ or $M_2$ and available for transmission to the central station or to the operator.

Processing provided by the two processors 2 and 7 with distinct functions have been described. Without departing from the scope of the invention, a single processor capable of fulfilling alone all the functions of the two processors 2 and 7 may for example be used.

We claim:

1. A seismic acquisition system with decentralized processing capacity for reducing a volume of data to be transmitted with a communication link to at least one control unit and centralized therein comprising:

at least one acquisition device for collecting the data in response to seismic signals received by an array of seismic receivers positioned on a field and transmitted to the at least one acquisition device, the at least one acquisition device including at least one acquisition chain for digitizing signals received by at least one of the seismic receivers and a control set for controlling acquisition and storage of signals, the control set including a processor and a digital signal processor controlled by the processor, the digital signal processor being programmed for performing processing operations on the seismic signals before transmission thereof to the control unit and for performing quality control on each seismic receiver and each acquisition chain and functioning according to two methods of operation, one method of operation being an active mode for performing the data processing operations and the quality control and the other operation being a standby mode having a lower power consumption than power consumption during the active mode.

2. A system as claimed in claim 1 comprising:

means for compressing the digitized signals before transmission to the control unit.

3. A system as claimed in claim 1 further comprising:

means in the control set for correlating signals received by the at least one receiver with emitted signals to reduce data to be centralized in the control unit.

4. A seismic acquisition system with decentralized processing capacity for reducing a volume of data to be transmitted with a communication link to at least one control unit and centralized therein comprising:

at least one acquisition device for collecting the data in response to seismic signals received by an array of seismic receivers positioned on a field and transmitted to the at least one acquisition device, the at least one acquisition device including at least one acquisition chain for digitizing signals received by at least one of the seismic receivers and a control set for controlling acquisition and storage of signals, the control set including a processor and a digital signal processor controlled by the processor, the digital signal processor being programmed for performing processing operations on the seismic signals before transmission thereof to the control unit and for performing quality control on each seismic receiver and each acquisition chain and functioning to determine electric and electromechanical characteristics of each seismic receiver by using an electrical circuit model of each seismic receiver.

5. A system as claimed in claim 4 comprising:

means for compressing the digitized signals before transmission to the control unit.

6. A system as claimed in claim 4 comprising:

means for combining seismic signals received at different times by at least one of the receivers.

7. A system as claimed in claim 4 wherein:

the control unit is a central seismic laboratory.

8. A system as claimed in claim 4 wherein:

the control unit is a control box connected to each acquisition device with a transmission link for providing communications allowing an operator to control the performing of the quality control on each seismic receiver to determine if positioning of each receiver on the field is correct and if each acquisition chain is operating correctly.

9. A system a claimed in claim 4 wherein:

each acquisition device includes two storage units for providing alternate storage of data received during successive emission-reception cycles of the seismic receivers and transmission devices for transmitting at least part of the data contained in a first storage unit during acquisition and storage of seismic data in a second storage unit.

10. A system as claimed in claim 4 wherein:

each acquisition device includes a permanent memory for storing instructions received from the control unit via the communication link.

11. A system as claimed in claim 4 wherein:

each acquisition device includes a first and a second switching module associated with each seismic receiver for successively connecting the seismic receiver and an associated reference resistance to an input of a signal acquisition chain, a third and a fourth switching module connected to a power supply for applying electrical power to each seismic receiver and to the associated reference resistance, and at least one local oscillator for applying test signals having a predetermined at least one of frequency and amplitude to the input of the acquisition chain.

12. A system as claimed in claim 11 wherein:

the control set performs fast Fourier transformer to test each acquisition chain.

13. A system as claimed in claim 11 comprising:

a switching device for successively applying the test signals to a plurality of seismic receivers associated with a single acquisition device and means for measuring crosstalk between channels and a distortion level of the receivers.

14. A system as claimed in claim 13 wherein:

the control set controls the switching modules to measure leakage currents between each receiver and ground.

15. A system as claimed in claim 13 wherein:

the control set performs fast Fourier transforms to test each acquisition chain.

16. A system as claimed in claim 4 further comprising:

means in the control set for correlating signals received by the at least one receiver with emitted signals to reduce data to be centralized in the control unit.

17. A seismic acquisition method for reducing a volume of data to be transmitted between at least one acquisition device in response to signals received by an array of seismic receivers coupled to a zone to be explored and at least one control unit including performing in each acquisition device tests on each seismic receiver to determine electrical and electromechanical properties thereof comprising:

applying to each receiver calibrated signals and recording an actual response curve thereof in response to the calibrated signals;

making a model of the seismic receivers with an equivalent electrical circuit and forming a reference response curve of the equivalent electrical circuit;

determining a response curve of the model of the seismic receivers and deviations thereof from the reference response curve; and optimizing the model of the seismic receivers by reducing the deviations according to an iterative operative sequence by modifying the equivalent electrical circuit and comparing the reference response curve obtained after modification with the actual response curve to determine the electrical circuit model which is a best electrical circuit model of the seismic receivers for use in determining the electrical and electromechanical properties thereof during the testing.

18. A method as claimed in claim 17 comprising:

positioning each of the receivers on the field and testing positioning thereof by transmitting the determined electrical and electromechanical properties of each receiver to the control unit.

19. A method as claimed in claim 17 comprising:

positioning each of the receivers on the field and testing positioning thereof by transmitting the determined electrical and electromechanical properties of each receiver to an operator associated with the field.

20. A method as claimed in claim 17 further comprising:

correlating signals received by at least one of the plurality of seismic receivers with emitted signals for reducing data to be centralized in the control unit.

* * * * *